US012730662B2

(12) United States Patent
Hsiao et al.

(10) Patent No.: US 12,730,662 B2
(45) Date of Patent: Sep. 8, 2026

(54) VIRTUAL MACHINE OPERATING SYSTEM CONFIGURATION SYSTEM

(71) Applicant: MEDIATEK INC., Hsin-Chu (TW)

(72) Inventors: Chih-Hsiang Hsiao, Hsinchu City (TW); Ze-Yu Wang, Hsinchu City (TW); Yingshiuan Pan, Hsinchu City (TW); Pei-Lun Suei, Hsinchu City (TW)

(73) Assignee: MEDIATEK INC., Hsinchu City (TW)

( * ) Notice: Subject to any disclaimer, the term of this patent is extended or adjusted under 35 U.S.C. 154(b) by 429 days.

(21) Appl. No.: 18/239,133

(22) Filed: Aug. 29, 2023

(65) Prior Publication Data

US 2024/0241744 A1 Jul. 18, 2024

Related U.S. Application Data

(60) Provisional application No. 63/439,276, filed on Jan. 17, 2023.

(51) Int. Cl.
*G06F 9/45* (2006.01)
*G06F 9/455* (2018.01)

(52) U.S. Cl.
CPC .................... *G06F 9/45558* (2013.01); *G06F 2009/45579* (2013.01); *G06F 2009/45591* (2013.01)

(58) Field of Classification Search
CPC ....... G06F 9/45558; G06F 2009/45579; G06F 2009/45591; G06F 2009/45575
USPC .............................................................. 718/1
See application file for complete search history.

(56) References Cited

U.S. PATENT DOCUMENTS

2002/0173997 A1* 11/2002 Menard .................. G06Q 30/06 709/223
2008/0134178 A1* 6/2008 Fitzgerald ........... G06F 9/45537 718/1
2008/0163209 A1* 7/2008 Rozas ................ G06F 9/45558 718/1
2009/0049510 A1* 2/2009 Zhang ..................... G06F 21/53 718/1
2009/0265707 A1* 10/2009 Goodman ............. G06F 9/5027 718/1
2011/0238969 A1* 9/2011 Warkentin .............. G06F 9/441 713/1
2012/0069842 A1* 3/2012 Reddy ................... H04L 49/602 370/388

(Continued)

FOREIGN PATENT DOCUMENTS

CN 113544663 A 10/2021
TW 202101237 A 1/2021

*Primary Examiner* — Tuan C Dao
(74) *Attorney, Agent, or Firm* — Winston Hsu

(57) ABSTRACT

A virtual machine (VM) operating system (OS) configuration system includes a processor, wherein the processor is arranged to execute a host VM, a hypervisor, a root module, and a guest VM. The host VM is arranged to generate a driving signal for driving a booting of a guest VM. The hypervisor is arranged to generate a first trigger signal according to the driving signal, for triggering verification of a descriptor. The root module is arranged to verify the descriptor according to the first trigger signal to generate a verified descriptor, and store the verified descriptor in a protected memory, wherein an OS of the guest VM is configured according to the verified descriptor.

13 Claims, 4 Drawing Sheets

(56) References Cited

U.S. PATENT DOCUMENTS

| | | | | |
|---|---|---|---|---|
| 2012/0226895 | A1* | 9/2012 | Anderson | G06F 21/575<br>713/2 |
| 2013/0054948 | A1* | 2/2013 | Raj | G06F 21/575<br>713/2 |
| 2014/0115228 | A1* | 4/2014 | Zhou | G06F 12/0246<br>711/102 |
| 2015/0195128 | A1* | 7/2015 | Kim | G06F 9/45558<br>709/220 |
| 2015/0324216 | A1* | 11/2015 | Sizemore | G06F 9/45558<br>718/1 |
| 2016/0156591 | A1* | 6/2016 | Zhou | G06F 9/45558<br>726/13 |
| 2016/0266938 | A1* | 9/2016 | Suzuki | G06F 9/45558 |
| 2016/0366130 | A1* | 12/2016 | Jung | G06F 9/45558 |
| 2017/0090963 | A1* | 3/2017 | Nakajima | G06F 9/45558 |
| 2017/0168903 | A1* | 6/2017 | Dornemann | G06F 11/2038 |
| 2017/0359378 | A1* | 12/2017 | Reitsma | H04L 63/20 |
| 2018/0285200 | A1* | 10/2018 | Inbaraj | G06F 9/45558 |
| 2018/0300166 | A1 | 10/2018 | Liguori | |
| 2019/0102539 | A1 | 4/2019 | Durham | |
| 2019/0173764 | A1* | 6/2019 | Di Martino | H04L 41/122 |
| 2019/0273683 | A1* | 9/2019 | Jiang | G06F 9/45558 |
| 2021/0232681 | A1 | 7/2021 | Tsirkin | |
| 2021/0264559 | A1* | 8/2021 | Roper | G06F 9/45558 |

* cited by examiner

VIRTUAL MACHINE OPERATING SYSTEM CONFIGURATION SYSTEM

CROSS REFERENCE TO RELATED APPLICATIONS

This application claims the benefit of U.S. Provisional Application No. 63/439,276, filed on Jan. 17, 2023. The content of the application is incorporated herein by reference.

BACKGROUND

The present invention is related to virtualization, and more particularly, to a virtual machine (VM) operating system (OS) configuration system and an associated non-transitory machine-readable medium.

For an edge device (e.g. a mobile phone or a tablet) running with a Linux kernel, the edge device provides a virtualization framework based on security considerations. The virtualization framework uses a hypervisor to generate multiple VMs, wherein the VMs are protected by hardware in the edge device, each of the VMs can run its own OS, and the Linux therein will use a descriptor (e.g. a device tree blob, dtb) to describe the platform of the edge device (e.g. the hardware resource of the edge device, such as the size and the location of a central processing unit (CPU) or a memory). However, the edge device may be prone to being attacked through the dtb by an attacker (e.g. an original hardware device in the edge device may be replaced by a fake hardware device).

In order to ensure the security of the dtb, the dtb can be pre-integrated into a secure boot for being verified, loaded, and protected by the secure boot, and can be stored into a protected memory from the secure boot. When there is a need, a guest VM can be dynamically generated by the hypervisor, and the hypervisor can obtain the dtb from the protected memory for configuring an OS of the guest VM. Some problems may occur, however. Under a condition that the dtb needs to be pre-integrated into the secure boot, the dtb cannot be modified during a production stage of the edge device, which may cause inconvenience to manufacturers.

SUMMARY

It is therefore one of the objectives of the present invention to provide a VM OS configuration system and an associated non-transitory machine-readable medium, to address the above-mentioned issues.

According to an embodiment of the present invention, a VM OS configuration system is provided. The VM OS configuration system includes a processor, wherein the processor is arranged to execute a host VM, a hypervisor, a root module, and a guest VM. The host VM is arranged to generate a driving signal for driving a booting of a guest VM. The hypervisor is arranged to generate a first trigger signal according to the driving signal, for triggering verification of a descriptor. The root module is arranged to verify the descriptor according to the first trigger signal to generate a verified descriptor, and store the verified descriptor in a protected memory, wherein an OS of the guest VM is configured according to the verified descriptor.

According to an embodiment of the present invention, a non-transitory machine-readable medium for storing a program code is provided, wherein when loaded and executed by a processor, the program code instructs the processor to execute: a host VM, a hypervisor, a root module, and a guest VM. The host VM is arranged to generate a driving signal for driving a booting of a guest VM. The hypervisor is arranged to generate a first trigger signal according to the driving signal, for triggering verification of a descriptor. The root module is arranged to verify the descriptor according to the first trigger signal to generate a verified descriptor, and store the verified descriptor in a protected memory, wherein an OS of the guest VM is configured according to the verified descriptor.

One of the benefits of the present invention is that, by the VM OS configuration system of the present invention, before the OS of the guest VM is configured, the dtb can be verified by the root VM/root device/APP to ensure the security of the dtb without intervention of a secure boot. In this way, the dtb is not limited to be obtained from the secure boot, which can greatly improve design flexibility. In addition, since the dtb can be modified during a production stage of an electronic device, it can bring convenience to manufacturers.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ".

Figure 1:
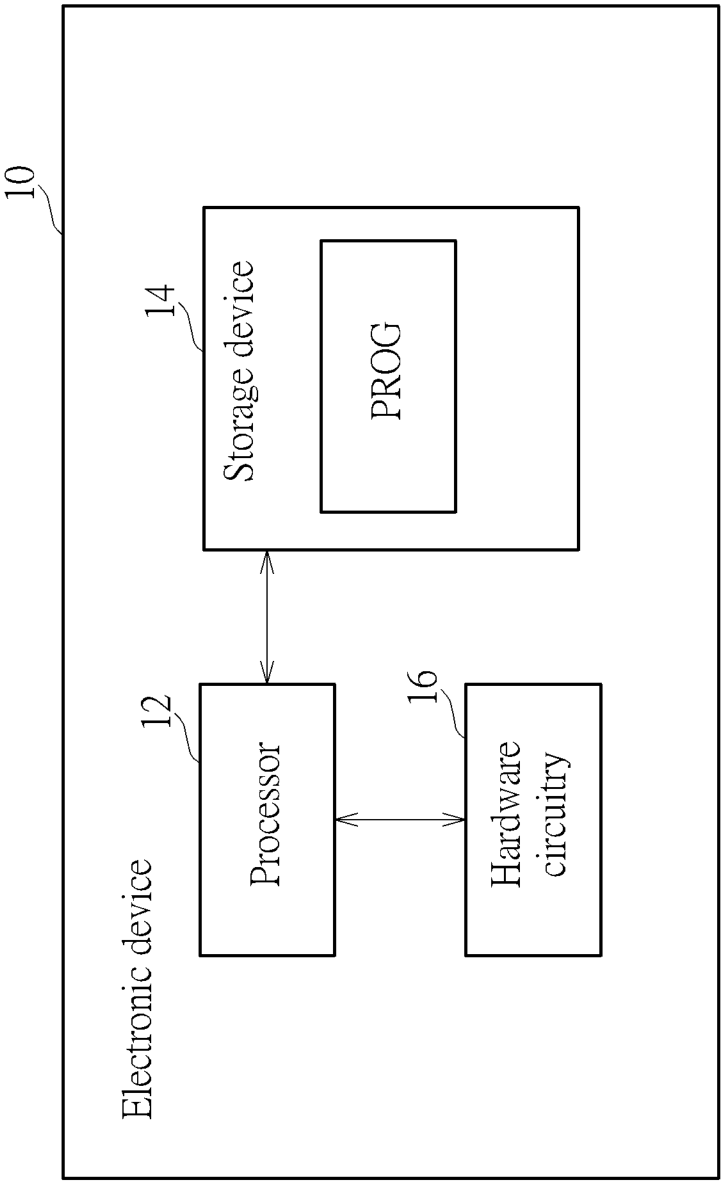
FIG. 1 is a diagram illustrating an electronic device according to an embodiment of the present invention.

FIG. 1 is a diagram illustrating an electronic device 10 according to an embodiment of the present invention. By way of example, but not limitation, the electronic device 10 may be a portable device such as a smartphone or a tablet. The electronic device 10 may include a processor 12, a storage device 14, and a hardware circuitry 16. The processor 12 may be a single-core processor or a multi-core processor. The storage device 14 is a computer-readable medium, and is arranged to store computer program code PROG. The processor 12 is equipped with software execution capability. The computer program code PROG may include a plurality of software modules. Hence, when loaded and executed by the processor 12, the computer program code PROG instructs the processor 12 to perform designated functions of the software modules. The electronic device 10 may be regarded as a computer system using a computer program product that includes a computer-readable medium containing the computer program code. The hardware circuitry 16 is pure hardware that may consist of logic gates only, and performs designated functions without software execution. Regarding a virtual machine (VM) operating system (OS) configuration system as proposed by the present invention, it may be embodied on the electronic device 10. For example, the VM OS configuration system may include software-based functions implemented by computer program code PROG running on the processor 12 and/or hardware-based functions implemented by the hardware circuitry 16.

Figure 2:
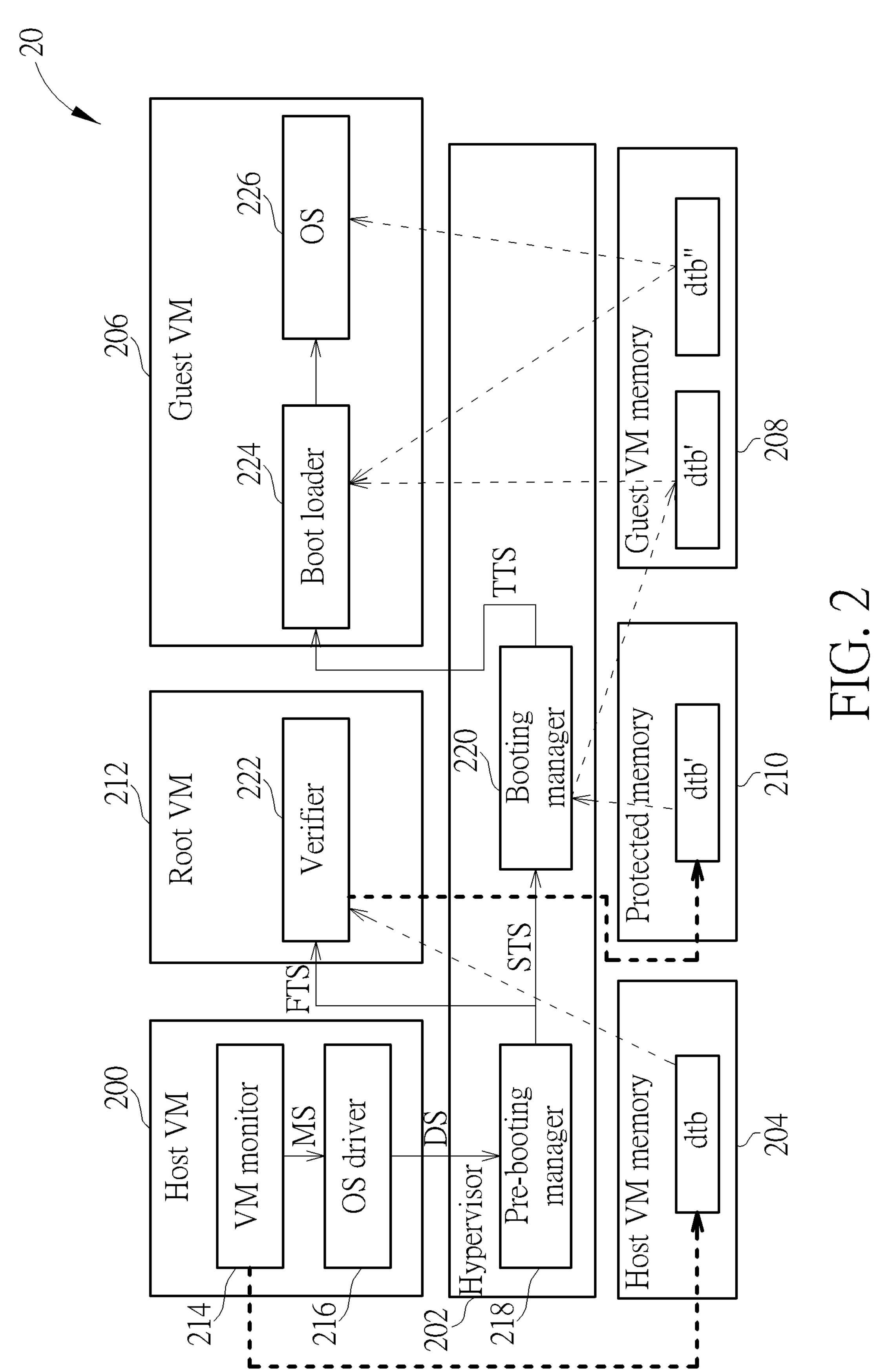
FIG. 2 is a diagram illustrating a VM OS configuration system according to an embodiment of the present invention.

FIG. 2 is a diagram illustrating a VM OS configuration system 20 according to an embodiment of the present invention. The VM OS configuration system 20 may include a processor (e.g. the processor 12 shown in FIG. 1), a host VM memory 204, a guest VM memory 208, and a protected memory 210. The processor may be arranged to execute software modules, including a host VM 200 and a hypervisor 202. When there is a need, at least one guest VM can be dynamically generated by the hypervisor 202. In this embodiment, the processor may be arranged to execute a guest VM 206 generated by the hypervisor 202. This is for illustration only, and the present invention is not limited thereto. In some embodiments, more than one guest VM may be executed by the processor, depending upon design requirements. In addition, the processor may be further arranged to execute a root module that is a software module generated by the hypervisor 202. For example, the root module may be a root VM 212, however, the present invention is not limited thereto. In some embodiments, the root module may be implemented by an application (APP) generated by the hypervisor 212. In some embodiments, the root module may be a hardware component executed on the processor.

As shown in FIG. 2, the host VM 200 may include a VM monitor 214 and an OS driver 216 (e.g. a Linux driver), wherein the VM monitor 214 may be arranged to generate a monitor signal MS in response to the guest VM 206 being required to be generated, and the OS driver 216 may be arranged to generate a driving signal DS according to the monitor signal MS, for driving a booting of the guest VM 206 (e.g. driving an OS 226 of the guest VM 206, such as a Linux of the guest VM 206). In addition, the host VM 200 (more particularly, the VM monitor 214) may be further arranged to store a descriptor (e.g. a device tree blob, dtb) in the host VM memory 204, for describing platform (e.g. hardware resource) of the electronic device 10 where the VM OS configuration system 20 is embodied, such as the size and the location of the processor or memories (e.g. the host VM memory 204, the guest VM memory 208, and the protected memory 210). It should be noted that in some embodiments, the dtb stored in the host VM memory 204 may be provided by a network or other APP running on the processor.

The hypervisor 202 may include a pre-booting manager 218 and a booting manager 220. The pre-booting manager 218 may be arranged to receive the driving signal DS from the OS driver 216, and generate a first trigger signal FTS to the root VM 212 according to the driving signal DS, for triggering verification of the dtb. The root VM 212 may include a verifier 222, wherein the verifier 222 may be arranged to obtain the dtb from the host VM memory 204, verify the dtb according to the first trigger signal FTS to generate a verified dtb (denoted by "dtb'"), and store the dtb' in the protected memory 210. After the verification of the dtb is completed (e.g. after the dtb' is stored in the protected memory 210), the pre-booting manager 218 may be further arranged to generate a second trigger signal STS to the booting manager 220 for triggering the booting of the guest VM 206.

The booting manager 220 may be arranged to perform the booting of the guest VM 206 according to the second trigger signal STS. Specifically, the booting manager 220 may obtain the dtb' from the protected memory 210, copy the dtb' to the guest VM memory 208, and generate a third trigger signal TTS to the guest VM 206 for triggering subsequent processing. The guest VM 206 may include a boot loader 224. After receiving the third trigger signal TTS, the boot loader 224 may be arranged to obtain the dtb' from the guest VM memory 208, and perform a check operation upon the dtb', to generate a checked dtb (denoted by "dtb''") for storing in the guest VM memory 208. For example, under a condition that it is checked that there is no error in the dtb, some security-related nodes can be added to the dtb to generate the dtb''. The OS 226 of the guest VM 206 may be configured by the dtb''stored in the guest VM memory 208.

Figure 3:
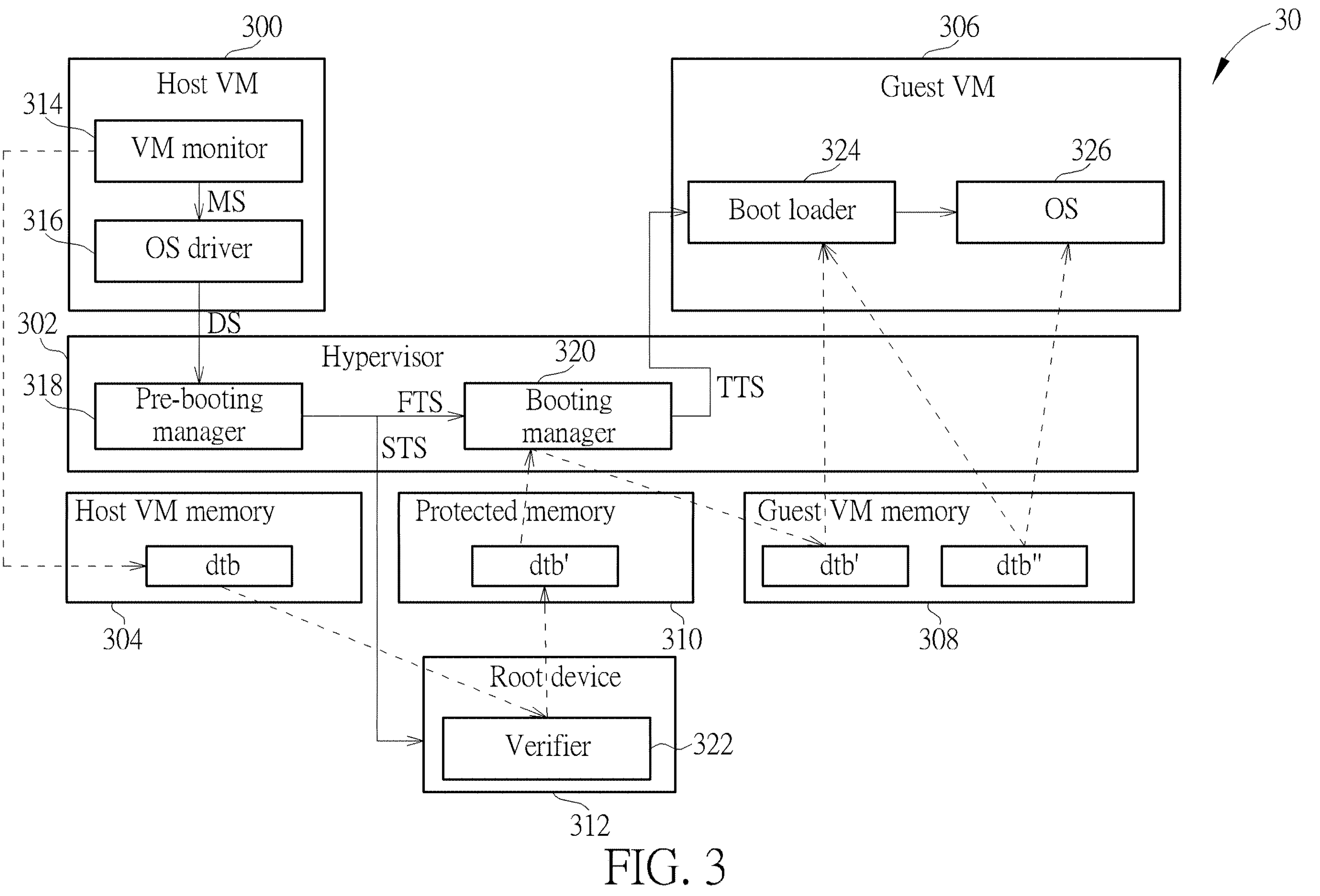
FIG. 3 is a diagram illustrating a VM OS configuration system according to another embodiment of the present invention.

FIG. 3 is a diagram illustrating a VM OS configuration system 30 according to another embodiment of the present invention. The VM OS configuration system 30 may include a processor (e.g. the processor 12 shown in FIG. 1), a host VM memory 304, a guest VM memory 308, and a protected memory 310. The processor may be arranged to execute software modules, including a host VM 300 and a hypervisor 302, wherein the host VM 300 may include a VMM 314 and an OS driver 316, and the hypervisor 302 may include a pre-booting manager 318 and a booting manager 320. When there is a need, at least one guest VM can be dynamically generated by the hypervisor 302. In this embodiment, the processor may be arranged to execute a guest VM 306 generated by the hypervisor 302, wherein the guest VM 306 may include a boot loader 324. In addition, the VM OS configuration system 30 may further include a root module that is a hardware component executed on the processor (e.g. a root device 312). For example, the root device 312 may be a part of the hardware circuitry 16 shown in FIG. 1. The root device 312 may include a verifier 322, wherein the verifier 322 may be arranged to obtain the dtb from the host VM memory 304, verify the dtb according to the first trigger signal FTS to generate a verified dtb (denoted by "dtb'"), and store the dtb' in the protected memory 310. The operations of the root device 312 are similar to that of the root VM 212 shown in FIG. 2, that is, the verification mechanism for the dtb of the VM OS configuration system 30 is implemented through hardware. Since the operations of the VM OS configuration system 30 are similar to that of the VM OS configuration system 20 shown in FIG. 2, similar descriptions for this embodiment are not repeated in detail here for brevity.

Figure 4:
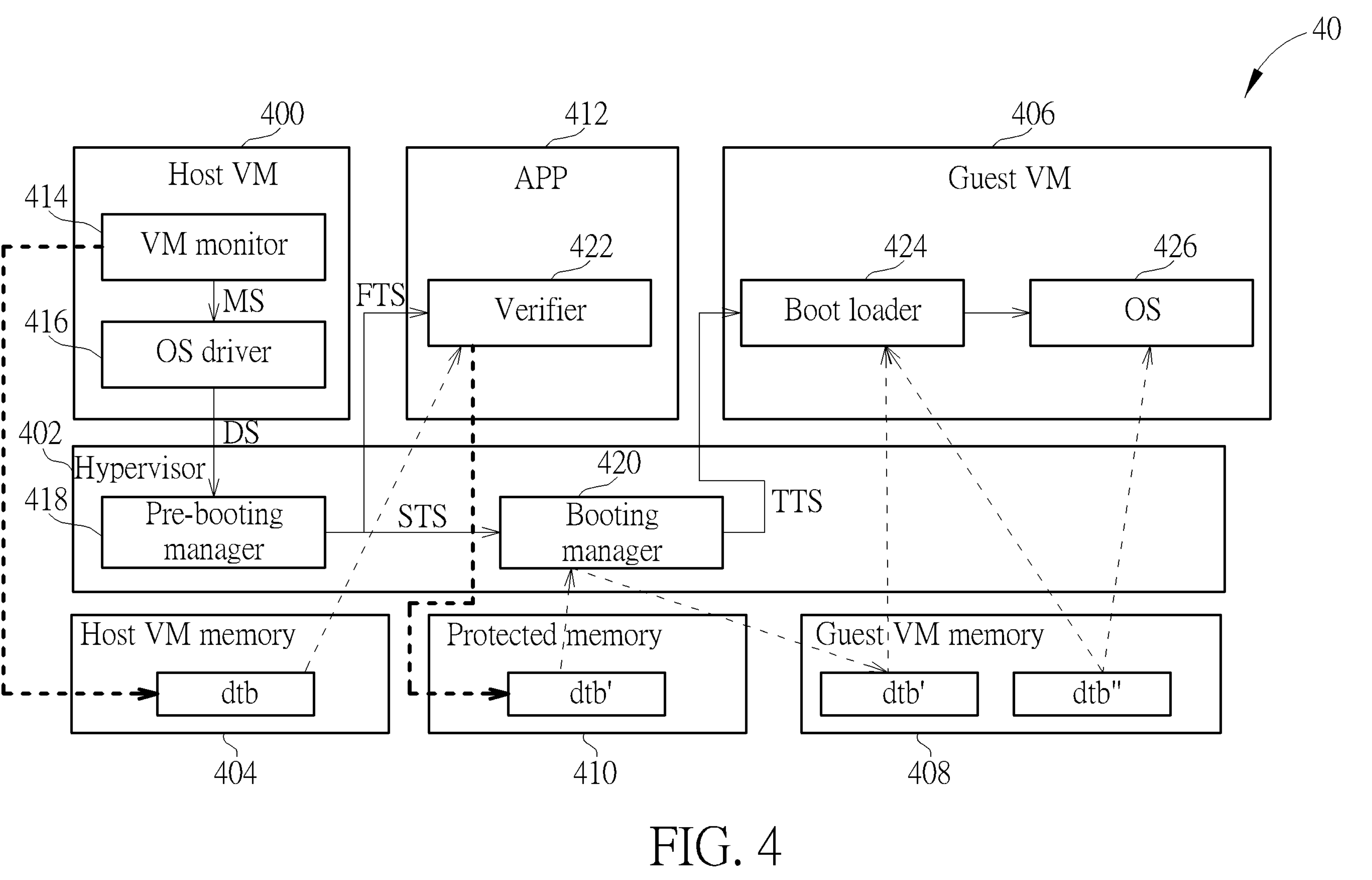
FIG. 4 is a diagram illustrating a VM OS configuration system according to yet another embodiment of the present invention.

For the VM OS configuration system 20 shown in FIG. 2, an OS may need to run on the root VM 212, which may increase the cost. In order to address this issue, an APP that is generated by the hypervisor may run on the processor for verification of the dtb. FIG. 4 is a diagram illustrating a VM OS configuration system 40 according to yet another embodiment of the present invention. The VM OS configuration system 40 may include a processor (e.g. the processor 12 shown in FIG. 1), a host VM memory 404, a guest VM memory 408, and a protected memory 410. The processor may be arranged to execute software modules, including a host VM 400 and a hypervisor 402, wherein the host VM 400 may include a VMM 414 and an OS driver 416, and the hypervisor 402 may include a pre-booting manager 418 and a booting manager 420. When there is a need, at least one guest VM can be dynamically generated by the hypervisor 402. In this embodiment, the processor may be arranged to execute a guest VM 406 generated by the hypervisor 402, wherein the guest VM 406 may include a boot loader 424. In addition, the processor may be further arranged to execute a root module that is a software module generated by the hypervisor 202. For example, the root module may be implemented by an APP 412 generated by the hypervisor 402. The APP 412 may include a verifier 422, wherein the verifier 422 may be arranged to obtain the dtb from the host VM memory 404, verify the dtb according to the first trigger signal FTS to generate a verified dtb (denoted by "dtb'"), and store the dtb' in the protected memory 410. The operations of the APP 412 are similar to that of the root VM 212 shown in FIG. 2, that is, the verification mechanism for the dtb of the VM OS configuration system 40 is implemented through software. Since the operations of the VM OS configuration system 40 are similar to that of the VM OS configuration system 20 shown in FIG. 2, similar descriptions for this embodiment are not repeated in detail here for brevity.

In summary, by the VM OS configuration system 20/30/40 of the present invention, before the OS 226/326/426 of the guest VM 206/306/406 is configured, the dtb can be verified by the root VM 212/root device 312/APP 412 to ensure the security of the dtb without intervention of a secure boot. In this way, the dtb is not limited to be obtained from the secure boot, which can greatly improve design flexibility. In addition, since the dtb can be modified during a production stage of the electronic device 10, it can bring convenience to manufacturers.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A virtual machine (VM) operating system (OS) configuration system, comprising:
- a processor, arranged to execute:
  - a host VM, arranged to generate a driving signal for driving a booting of a guest VM;
  - a hypervisor, arranged to generate a first trigger signal according to the driving signal, for triggering verification of a descriptor;
  - a root module, arranged to verify the descriptor according to the first trigger signal to generate a verified descriptor, and store the verified descriptor in a protected memory; and
  - the guest VM, comprising:
    - a boot loader, arranged to perform a check operation upon the verified descriptor, to generate a checked descriptor, wherein in response to the checked descriptor not existing an error, at least one security-associated node is added to the descriptor in order to generate the checked descriptor, for configuring the OS of the guest VM.

2. The VM OS configuration system of claim 1, wherein the descriptor is provided by the host VM.

3. The VM OS configuration system of claim 1, wherein the host VM comprises:
- a VM monitor, arranged to generate a monitor signal in response to the guest VM being required to be generated; and
- an OS driver, arranged to generate the driving signal according to the monitor signal.

4. The VM OS configuration system of claim 3, wherein the VM monitor is further arranged to provide the descriptor to a host VM memory, and the root module is further arranged to obtain the descriptor from the host VM memory.

5. The VM OS configuration system of claim 1, wherein the hypervisor comprises:
- a pre-booting manager, arranged to:
  - generate the first trigger signal according to the driving signal; and
  - after the verification of the descriptor is completed, generate a second trigger signal for triggering the booting of the guest VM; and
- a booting manager, arranged to perform the booting of the guest VM according to the second trigger signal.

6. The VM OS configuration system of claim 1, wherein the root module is a root VM generated by the hypervisor.

7. The VM OS configuration system of claim 1, wherein the root module is a hardware component executed on the processor.

8. The VM OS configuration system of claim 1, wherein the root module is implemented by an application (APP) generated by the hypervisor.

9. A non-transitory machine-readable medium for storing a program code, wherein when loaded and executed by a processor, the program code instructs the processor to execute:
- a host VM, arranged to generate a driving signal for driving a booting of a guest VM;
- a hypervisor, arranged to generate a first trigger signal according to the driving signal, for triggering verification of a descriptor;
- a root module, arranged to verify the descriptor according to the first trigger signal to generate a verified descriptor, and store the verified descriptor in a protected memory; and
- the guest VM comprising:
  - a boot loader, arranged to perform a check operation upon the verified descriptor, to generate a checked descriptor, wherein in response to the checked descriptor not existing an error, at least one security-associated node is added to the descriptor in order to generate the checked descriptor, for configuring the OS of the guest VM.

10. The non-transitory machine-readable medium of claim 9, wherein the descriptor is provided by the host VM.

11. The non-transitory machine-readable medium of claim 9, wherein the host VM comprises:
- a VM monitor, arranged to generate a monitor signal in response to the guest VM being required to be generated; and
- an OS driver, arranged to generate the driving signal according to the monitor signal.

12. The non-transitory machine-readable medium of claim 11, wherein the VM monitor is further arranged to provide the descriptor to a host VM memory, and the root module is further arranged to obtain the descriptor from the host VM memory.

13. The non-transitory machine-readable medium of claim 9, wherein the hypervisor comprises:
- a pre-booting manager, arranged to:
  - generate the first trigger signal according to the driving signal; and
  - after the verification of the descriptor is completed, generate a second trigger signal for triggering the booting of the guest VM; and a booting manager, arranged to perform the booting of the guest VM according to the second trigger signal.

* * * * *